(12) United States Patent
Kim

(10) Patent No.: US 8,336,104 B2
(45) Date of Patent: Dec. 18, 2012

(54) GENERATION AND USE OF DIGITAL CONTENTS

(75) Inventor: Woo Seok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 980 days.

(21) Appl. No.: 12/007,035

(22) Filed: Jan. 4, 2008

(65) Prior Publication Data
US 2009/0007221 A1   Jan. 1, 2009

(30) Foreign Application Priority Data
Jun. 28, 2007  (KR) ........................ 10-2007-0064795

(51) Int. Cl.
G06F 7/04      (2006.01)
H04L 9/32      (2006.01)

(52) U.S. Cl. .......................................... 726/26; 713/176

(58) Field of Classification Search .................... 726/26; 713/176
See application file for complete search history.

(56) References Cited

U.S. PATENT DOCUMENTS

| | | | |
|---|---|---|---|
| 5,983,351 A * | 11/1999 | Glogau ............................ 726/26 |
| 6,275,935 B1 * | 8/2001 | Barlow et al. ................. 713/182 |
| 7,409,142 B2 * | 8/2008 | Hirai ............................. 386/252 |
| 7,996,882 B2 * | 8/2011 | L'Heureux et al. ................ 726/4 |
| 2007/0083380 A1 * | 4/2007 | Martinez ........................... 705/1 |
| 2007/0083762 A1 * | 4/2007 | Martinez ........................ 713/176 |
| 2007/0112676 A1 * | 5/2007 | Kontio et al. ................... 705/50 |
| 2007/0198364 A1 * | 8/2007 | Quoc et al. ..................... 705/26 |
| 2007/0255965 A1 * | 11/2007 | McGucken .................. 713/193 |
| 2008/0178302 A1 * | 7/2008 | Brock et al. .................... 726/32 |
| 2008/0189283 A1 * | 8/2008 | Quoc et al. ........................ 707/9 |

FOREIGN PATENT DOCUMENTS
EP            0 715 264 A1    6/1996

OTHER PUBLICATIONS

Elkin-Koren, "Exploring Creative Commons: A Skeptical View of a Worthy Pursuit", The Future of the Public Domain, P. Bernt Hugenholtz & Lucie Guibault, Kluwer Law International, Dec. 31, 2006, pp. 1-16.

* cited by examiner

*Primary Examiner* — Techane Gergiso
(74) *Attorney, Agent, or Firm* — Birch, Stewart, Kolasch & Birch, LLP

(57) ABSTRACT

Provided are the generation and the use of user generated contents (UGC) to which a creative commons license (CCL) is applied. In a method of generating digital contents, a user interface window including a clause for managing digital contents copyright information and displaying the user interface window is generated, and digital contents including copyright information selected from the displayed user interface window is generated.

21 Claims, 8 Drawing Sheets

| | |
|---|---|
| (BY:) | (BY/Attribution)<br>CLAUSE THAT THE REAL NAME OR THE NICKNAME OF THE ORIGINAL COPYRIGHT HOLDER MUST BE DISPLAYED WHEN ORIGINAL MATERIALS OR A COPY OF COPYRIGHT MATERIALS, OR THE COPYRIGHT MATERIALS ARE PUBLISHED |
| (⊘) | (NC/Noncommercial)<br>CLAUSE THAT A USER CAN USE THE COPYRIGHT MATERIALS ONLY FOR NONCOMMERCIAL PURPOSES, AND THE USER CAN USE THE COPYRIGHT MATERIALS FOR COMMERCIAL PURPOSES ONLY IF HE OR SHE PAYS FOR THE COPYRIGHT MATERIALS ACCORDING TO THE TERMS OF AN ADDITIONAL CONTRACT |
| (=) | (ND/No Derivative Works)<br>CLAUSE THAT EVEN SIMPLE MODIFICATION OF THE CONTENTS AND THE TYPES OF COPYRIGHT MATERIALS AS WELL AS THE GENERATION OF SECONDARY COPYRIGHT MATERIALS USING THE COPYRIGHT MATERIALS ARE PROHIBITED |
| (⟳) | (SA/Share Alike)<br>CLAUSE THAT IN THE CASE WHERE SECONDARY COPYRIGHT MATERIALS ARE GENERATED USING COPYRIGHT MATERIALS THE SECONDARY COPYRIGHT MATERIALS ARE USED UNDER A LICENSE IDENTICAL TO THE LICENSE THAT GOVERNS THE COPYRIGHT MATERIALS, AND IN THE CASE WHERE SECONDARY COPYRIGHT MATERIALS ARE GENERATED USING COPYRIGHT MATERIALS THAT ARE USED ONLY FOR NONCOMMERCIAL PURPOSES THE SECONDDARY COPYRIGHT MATERIALS ARE USED UNDER A CONDITION IDENTICAL TO THE CONDITION THAT GOVERNS THE COPYRIGHT MATERIALS |

CLAUSES OF CREATIVE COMMONS LICENSE

| | | |
|---|---|---|
| (BY) | (BY/Attribution) | CLAUSE THAT THE REAL NAME OR THE NICKNAME OF THE ORIGINAL COPYRIGHT HOLDER MUST BE DISPLAYED WHEN ORIGINAL MATERIALS OR A COPY OF COPYRIGHT MATERIALS, OR THE COPYRIGHT MATERIALS ARE PUBLISHED |
| ⊘ | (NC/Noncommercial) | CLAUSE THAT A USER CAN USE THE COPYRIGHT MATERIALS ONLY FOR NONCOMMERCIAL PURPOSES, AND THE USER CAN USE THE COPYRIGHT MATERIALS FOR COMMERCIAL PURPOSES ONLY IF HE OR SHE PAYS FOR THE COPYRIGHT MATERIALS ACCORDING TO THE TERMS OF AN ADDITIONAL CONTRACT |
| = | (ND/No Derivative Works) | CLAUSE THAT EVEN SIMPLE MODIFICATION OF THE CONTENTS AND THE TYPES OF COPYRIGHT MATERIALS AS WELL AS THE GENERATION OF SECONDARY COPYRIGHT MATERIALS USING THE COPYRIGHT MATERIALS ARE PROHIBITED |
| ⊃ | (SA/Share Alike) | CLAUSE THAT IN THE CASE WHERE SECONDARY COPYRIGHT MATERIALS ARE GENERATED USING COPYRIGHT MATERIALS THE SECONDARY COPYRIGHT MATERIALS ARE USED UNDER A LICENSE IDENTICAL TO THE LICENSE THAT GOVERNS THE COPYRIGHT MATERIALS, AND IN THE CASE WHERE SECONDARY COPYRIGHT MATERIALS ARE GENERATED USING COPYRIGHT MATERIALS THAT ARE USED ONLY FOR NONCOMMERCIAL PURPOSES THE SECONDDARY COPYRIGHT MATERIALS ARE USED UNDER A CONDITION IDENTICAL TO THE CONDITION THAT GOVERNS THE COPYRIGHT MATERIALS |

CLAUSES OF CREATIVE COMMONS LICENSE

| CCL | Version | COPYRIGHT HOLDER | CREATION DATE | FILE TYPE | CCL TYPE | CCL ICON OFFSET | COPYRIGHT HOLDER DISPLAY FILE OFFSET | Upload Webpage address |
|---|---|---|---|---|---|---|---|---|

| AUTHORITY SETTING | CCL ICON | COPYRIGHT HOLDER DISPLAY FILE | ENCODING CONFIRM | DRM Header | ENCODED DRM KEY | Original Source |
|---|---|---|---|---|---|---|

FIG. 4

GENERATION AND USE OF DIGITAL CONTENTS

CROSS-REFERENCE TO RELATED APPLICATIONS

The present application claims priority under 35 U.S.C. 119 and 35 U.S.C. 365 to Korean Patent Application No. 10-2007-0064795 (filed on Jun. 28, 2007), which is hereby incorporated by reference in its entirety.

BACKGROUND

The present disclosure relates to the generation and the use of digital contents on the basis of copyright information.

Devices for receiving, storing, or reproducing digital contents such as moving picture data, image data, and audio data have been developed. Users can generate digital contents using such devices. User generated contents (UGC) can be transmitted between devices or uploaded/downloaded to/from websites, through wired and wireless networks. The digital contents can be combined with other contents, or edited to generate secondary contents. As such, when the digital contents are generated and used, it is required to manage the copyright of the secondary contents as well as that of the original digital contents.

Creative commons licenses (CCLs) are used to grant rights to use copyright materials and include information about methods and conditions for using the copyright materials. That is, common directions and common conditions are standardized to make standard licenses, and then the copyright holder selects a necessary license type among the standard licenses to display the license type in his/her copyright materials. Users check the license of the copyright materials and figure out the directions and the conditions for using the copyright materials, and then the users use the copyright materials. Hence, the users can figure out the directions and the conditions for using the copyright materials without direct contact with the copyright holder, and respect the copyright of the copyright materials. While most of copyright materials include only exclusive copyright indication such as "All rights reserved" or have no copyright mark, the copyright materials with the CCL can notify information about rights to use the copyright materials and the scope of the rights.

SUMMARY

Embodiments provide a method and a device, by which a user can set copyright information for digital copyright materials.

Embodiments also provide a method and a device, which can manage the use of digital copyright materials according to copyright information for digital copyright materials that is set.

Embodiments also provide a method and a device, which can apply copyright information to digital contents on the basis of a user interface.

Embodiments also provide a method and a device, which can edit copyright information applied to digital contents, on the basis of a user interface.

Embodiments also provide a method and a device, which can manage digital contents according to copyright information applied to the digital contents, on the basis of a user interface.

In one embodiment, a method of generating digital contents includes generating a user interface window including a clause for managing digital contents copyright information and displaying the user interface window, and generating digital contents including copyright information that selected from the displayed user interface window.

In another embodiment, a method for generating digital contents includes inputting a file creation command, inputting a command for applying copyright to a file to be created, selecting a copyright list to be applied, and creating the file by inserting the selected copyright clause into a file information selection of the file.

In further another embodiment, a method for managing digital contents includes determining whether copyright for a No Derivative Works clause is applied when a file is created, determining whether the file is encoded if the No Derivative Works clause is applied, applying digital right management for setting a key value if the file is encoded, and generating and storing final contents.

In still further another embodiment, a method of managing digital contents includes storing contents, checking tag information and copyright information of the saved contents, and classing the contents according to clauses of the copyright information to display the classified contents.

In still further another embodiment, a method of managing digital contents includes storing contents, checking copyright information of the contents, determining whether an No Derivative Works clause is included in the copyright information, determining whether a user has authority for the contents if the No Derivative Works clause is included in the contents, and modifying header information and a source of the contents if the user has the authority.

In still further another embodiment, a device includes a user input unit receiving a copyright application command when a file is created, a creative commons license generation unit inserting copyright information into head information of the file to be created, a storage unit in which an icon for the copyright information and contents are saved, and a control unit controlling to apply the selected copyright to the file.

The details of one or more embodiments are set forth in the accompanying drawings and the description below. Other features will be apparent from the description and drawings, and from the claims.

BRIEF DESCRIPTION OF THE DRAWINGS

FIG. 2 is a table illustrating CCL types.

FIG. 3 is a view illustrating selections in operation of applying a CCL to a created file according to an embodiment.

FIG. 4 is a view illustrating the configuration of a header file according to an embodiment.

DETAILED DESCRIPTION OF THE EMBODIMENTS

Reference will now be made in detail to the embodiments of the present disclosure, examples of which are illustrated in the accompanying drawings.

In the embodiments, while the application of copyright and copyright lists for contents means the application of a CCL for understanding and description convenience, the selection and the use of the term does not limit the present disclosure.

According to the embodiments, a user interface window is displayed, which includes at least one of an item capable of selecting whether copyright is applied and an item capable of selecting what type of copyright is applied. The items are considered as items for managing copyright information for digital contents. The copyright information selected and set in the displayed user interface window is included in the digital contents, thereby generating the digital contents including the set copyright information. The use of the generated digital contents such as the download and the reproduction of the digital contents, and the generation of secondary copyright materials are restricted by the set copyright information. The copyright information is set when the digital contents is generated. Alternatively, the copyright information is set in one of digital contents that were already generated or digital contents that were obtained through download.

Figure 1:
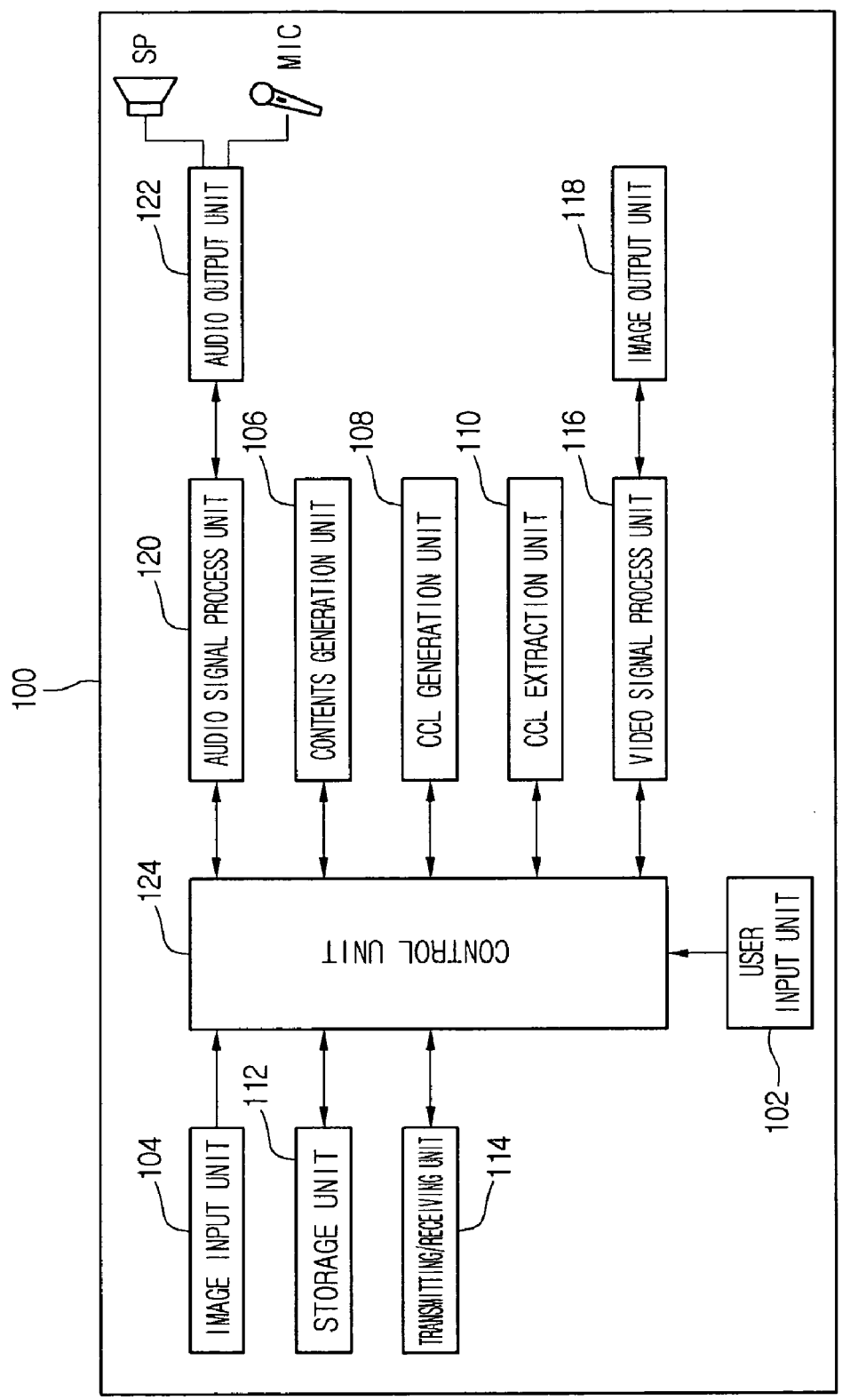
FIG. 1 is a block diagram illustrating the configuration of a terminal unit according to an embodiment.

Referring to FIG. 1, a terminal unit 100 according to an embodiment includes a user input unit 102 to which commands for generating and editing contents that a user intends to perform are input, an image input unit 104 for receiving image data from outside and converting the image data into digital signals, a contents generation unit 106 for generating the contents using the digital signals, a CCL generating unit 108 for applying a CCL to a file generated through the contents generation unit 106, a CCL extraction unit 110 for extracting CCL information out of contents input from a web or an exterior device, a storage unit 112 for storing data including various contents and CCL icons, a transmitting/receiving unit 114 for receiving data from an exterior device and transmitting data to the exterior device according to an interface and a communication protocol with the exterior device, a video signal process unit 116 for converting video data such as video image data and a user interface screen to video signals that is appropriate to a video output device and outputting the video signals to an image output unit 118, the image output unit 118 for displaying the video signals converted in the video signal process unit 116, and the user interface screen for selecting the operation of electronic devices (not shown) in the terminal unit 100, through an LCD display device (not shown), an audio signal process unit 120 for converting audio data to audio signals that is appropriate to an audio output device and outputting the audio signals to an audio output unit 122, the audio output unit 122 including a speaker for outputting voices and sounds corresponding to the audio signals output from the audio signal converter 120, and a control unit 124 for controlling to receive a command for determining whether the CCL is applied to the file to be created and apply a selected CCL clause to the file when a file creation command is input by the user.

The contents generation unit 106 generates the contents including the image data input from the image input unit 104 and a multimedia file saved in the storage unit 112 according to the control command of the control unit 124. When the contents are generated in the contents generation unit 106, the CCL generation unit 108 applies the CCL to the contents using the control command of the control unit 124 according to the CCL clause that the user selects in the contents. The CCL extraction unit 110 checks the header information of a file input from outside and extracts the CCL information so as to class the file according to the CCL information.

When the file is created, if the application of the contents is determined, the control unit 124 controls to apply the CCL to the file through the CCL generation unit 108, and controls to determine whether the applied CCL is displayed when the file is reproduced.

FIG. 2 is a table illustrating CCL types. CCL icons are included in the storage unit 112 shown in FIG. 1. When a file is created, a CCL clause is selected. The CCL clause is set in a header file to be applied to the file.

A "BY/Attribution" clause means that, the real name or the nickname of the original copyright holder must be displayed when original materials or a copy of copyright materials, or the copyright materials are published. An "NC/Noncommercial" clause means that a user can use the copyright materials only for noncommercial purposes, and the user can use the copyright materials for commercial purposes only if he or she pays for the copyright materials according to the terms of an additional contract. An "ND/No Derivative works" clause means that even simple modification of the contents and the types of copyright materials as well as the generation of secondary copyright materials using the copyright materials are prohibited. An "SA/Share Alike" clause means that in the case where secondary copyright materials are generated using copyright materials the secondary copyright materials are used under a license identical to the license that governs the copyright materials, and in the case where secondary copyright materials are generated using copyright materials that are used only for noncommercial purposes the secondary copyright materials are used under a condition identical to the condition that governs the copyright materials.

A function for selecting the name of a copyright holder, a date, a copyright holder use icon, or an image is provided to a terminal unit. A function for determining whether a CCL is applied to a file after images or voices are recorded, is also provided.

Figure 3:
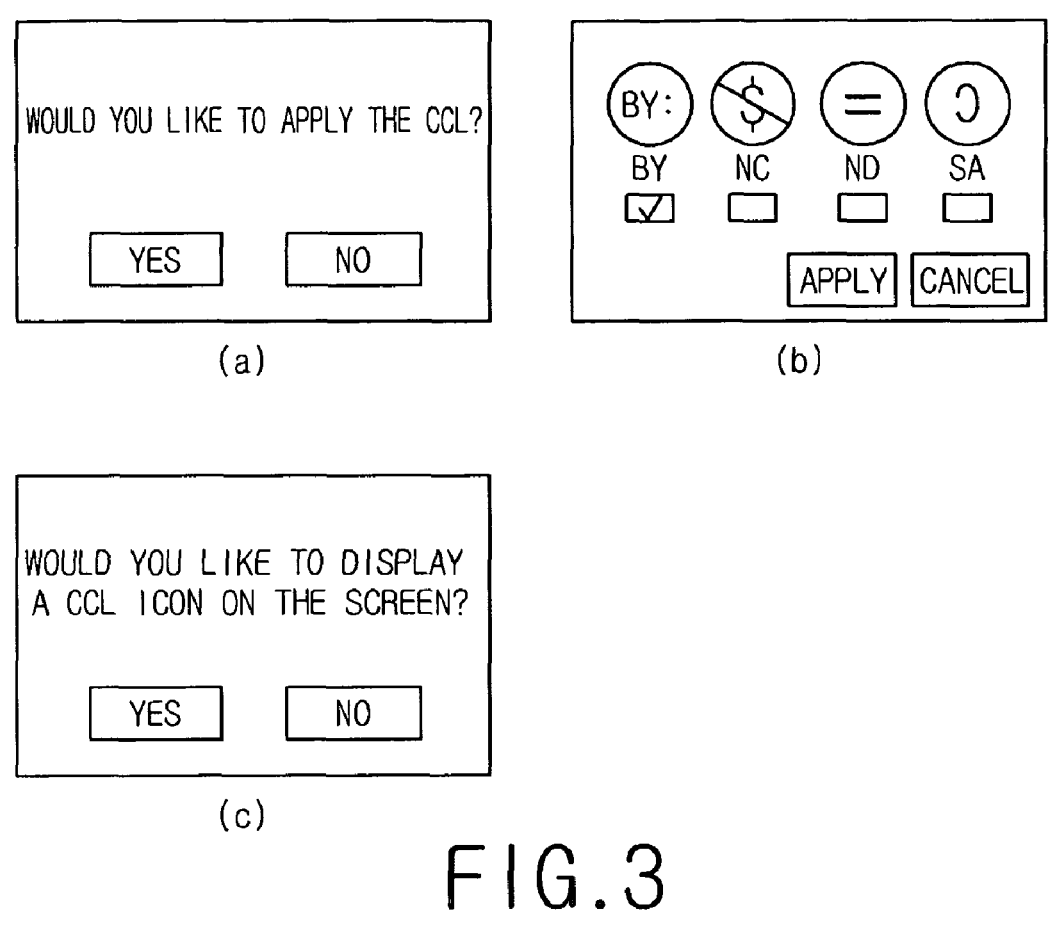

If the CCL is applied to the file, header information related to the CCL having predetermined regulations is applied to the file when the file is saved. If the CCL is not applied to a file, the file to which CCL header is not applied is saved. If the display of the CCL is selected in setting a device, an icon corresponding to the display is displayed at a position of a display, thereby indicating that the CCL is applied to the file. In addition, the terminal unit can be configured to display initials corresponding to the CCL clauses, such as BY, NC, ND, and SA instead of the icons. In the case of the setting of the Attribution clause, when a file is created and saved, the terminal unit may be configured to insert a predetermined size of image that the copyright holder sets as well as the information of the copyright holder into a header section, FIG. 3 is a view illustrating an example of a user interface screen according to an embodiment. Referring to a display window (a) of FIG. 3, when a file creation command is input and then encoded, "Would you like to apply the CCL?" is displayed in a display so as to determine whether the CCL is applied to a file and then a selection command is input by the user. If "YES" is selected, a CCL list including an icon that the user intends to select is displayed as illustrated in a display window (b). In here, multiple selections are possible. An appropriate CCL clause is selected, and then the CCL is applied to the file. In addition, as illustrated in a display window (c), when the file is created, a user interface may be configured to determine whether the applied CCL is displayed when the file is reproduced.

FIG. 4 is a view illustrating elements in a header file when a file is created according to an embodiment. First, a "CCL" field is assigned so as to determine whether a CCL is applied to the header file. In addition, a "version" field is assigned so as to identify the version of the header file. A "copyright holder" field is assigned so as to identify the person that generates contents. A "generation date" field is assigned so as to display the date on which the contents are generated, and a "file type" field is assigned so as to identify the file as one of moving pictures, texts, images, and audio files. A "CCL type" field is assigned so as to display what CCL is applied to corresponding contents, and a "CCL icon offset" field is assigned so as to display a position at which a CCL icon starts. In addition, a "copyright holder display file offset" field is assigned so as to indicate a position at which a copyright holder display file is displayed, and a "Upload Webpage address" field is assigned so as to identify a site address to which UGC are uploaded.

In addition, an authority-setting field is included so as to determine whether an original source can be modified, and set authority in detail. In the case of the modification of the original source, the whole thing of the original source is modified, a portion of the original source is modified, or the original source is not modified according to a digital rights management (hereinafter, referred to as "DRM") key value corresponding to the authority. A "CCL icon" field is assigned so as to include CCL icon data in the header file, and a "copyright holder display file" field is assigned. An "encoding confirmation" field is assigned so as to determine whether corresponding contents are encoded. If the "encoding confirmation" field is set to OFF, the following DRM key value and a DRM decoding process are skipped. A "DRM header" field including a DRM that is applied to the original source is assigned. An "encoded DRM key value" field is assigned. The authority for accessing to the original source to which modification authority setting and the DRM are applied, may be selected. In the case where a No Derivative Works clause is selected, an input value must be coincident with an encoded DRM key value that is required to access to a corresponding file.

Figure 5:
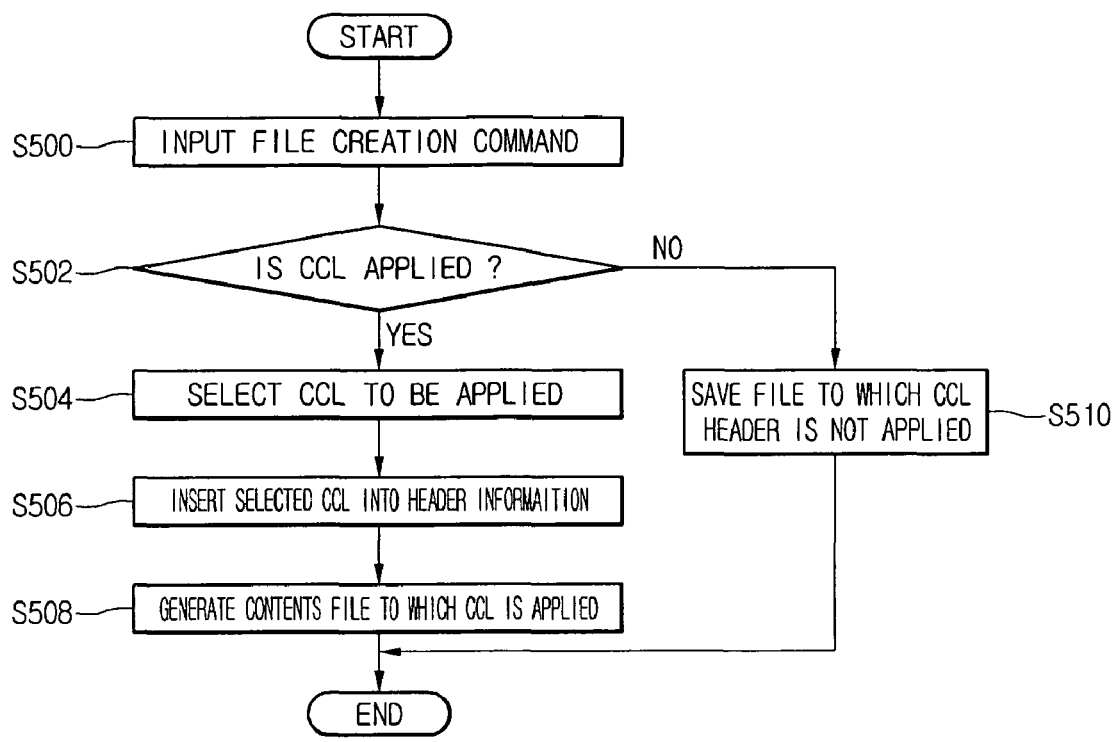
FIG. 5 is a flowchart illustrating a process of creating a file to which a CCL is applied according to an embodiment.

FIG. 5 is a flowchart illustrating a process of creating a file according to an embodiment. In operation S500, a file creation command is input by a user. In operation S502, a command for determining whether a CCL is applied to a corresponding file is input. The file may includes moving pictures, images, or audio files recorded by the user using a terminal unit, or be a existing file that is edited to apply a new header to the existing file.

If a command for applying the CCL is input, in operation S504, a CCL list is displayed in a window so as to select the CCL to be applied, and a selection command is input by the user. In addition, it is possible to input a command for determining whether the CCL that has been applied to the file is also displayed when the file is displayed. In operation S506, the selected CCL is inserted into the header of the file to be created. In operation S508, a new contents file is generated, that includes a header file to which the CCL is applied. In operation S510, if a command of no application of the CCL to the file is input, a file to which a CCL header is not applied is created.

Figure 6:
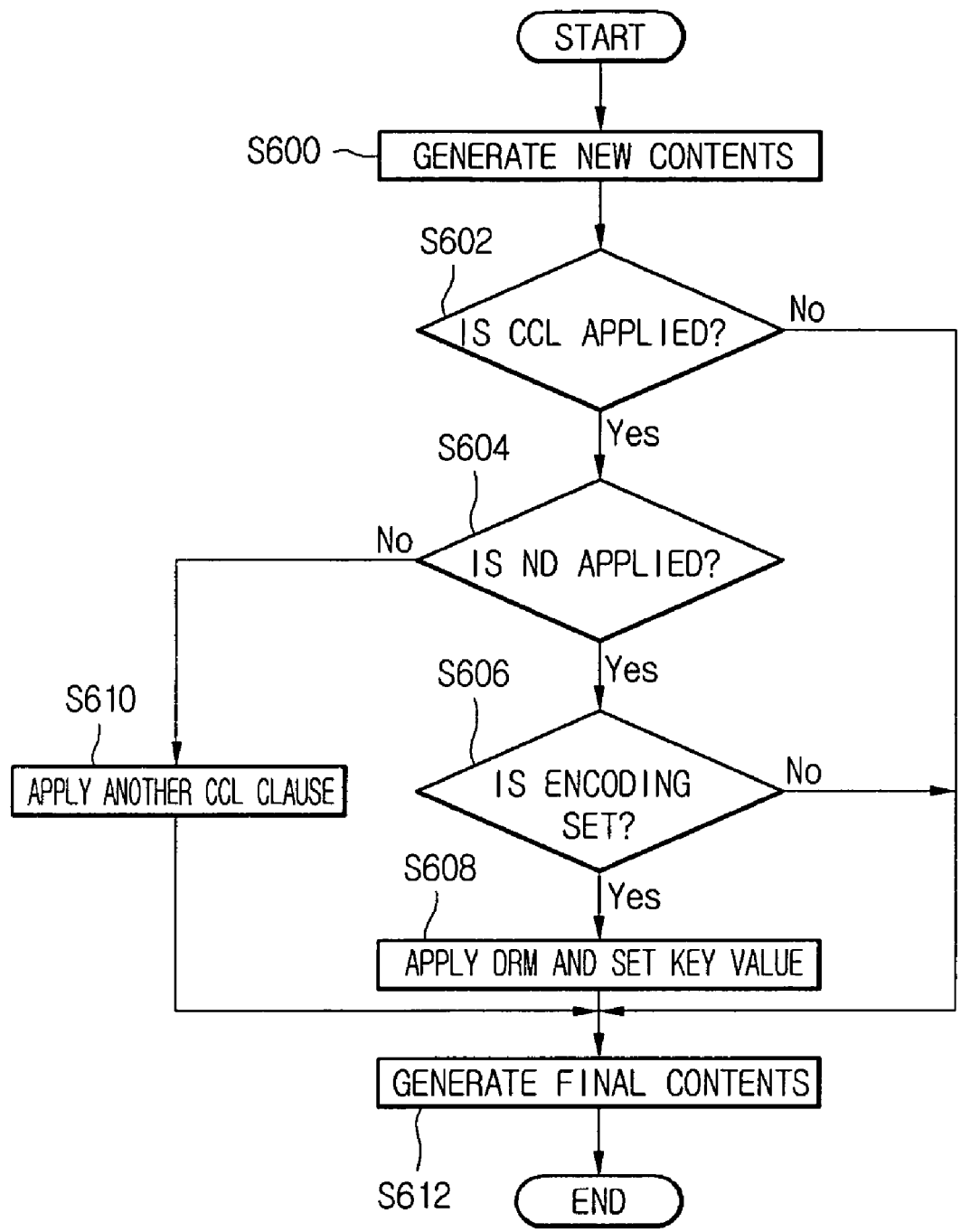
FIG. 6 is a flowchart illustrating a process of generating contents in which encoding is set through the application of a No Derivative Works clause according to an embodiment.

FIG. 6 is a flowchart illustrating a process of generating contents that are set to encoding by applying a No Derivation Works clause to the contents according to an embodiment. In operation S600, when a new image is recorded in a terminal unit, a process of creating a new file starts. In operation S602, it is determined whether a CCL is applied to the file to be created. After the determination is performed, in operation S604, it is determined whether the "No Derivation Works" clause of a CCL list is applied to the file. After the "No Derivation Works" clause is applied, in operation S606, it is determined whether the file is encoded to protect the contents. If the contents are set to the encoding, in operation S608, a DRM is applied to the file and a key value is set for an authority certification and then a detail authority is selected. In operation S610, if the "No Derivation Works" clause is not applied, another CCL clause is applied. If the contents are not set to the encoding, the "No Derivation Works" clause is applied and the DRM setting is not performed. After the application of the CCL clause and the DRM setting are finished, in operation S612, final contents are generated and saved.

Figure 7:
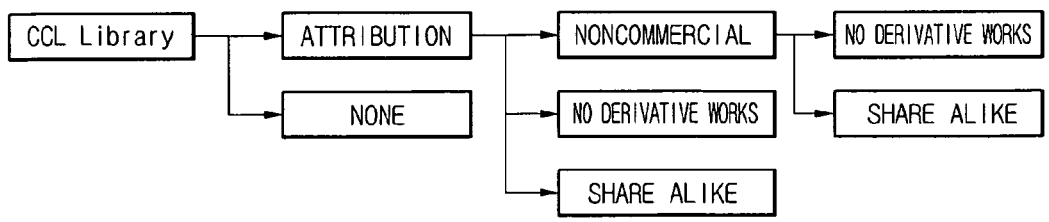
FIG. 7 is a view illustrating the classification of files by the CCL information of the files according to an embodiment.

FIG. 7 is a view illustrating the classification of files by the CCL information of the files according to an embodiment. When a file to which a CCL is applied is sent to any device and is then played, the type of the CCL is shown on a screen, and an image and copyright holder information that a copyright holder selected may be displayed. It is possible to manage digital rights by referring to header information of the file in the device and classing the image and the copyright holder information according to a CCL list. A CCL library is configured to include contents having an Attribution clause, which has a copyright holder, all contents having a NONE, to which the CCLs are not applied, contents having the Attribution clause and a Noncommercial clause, contents having the Attribution clause and a No Derivative Works clause, contents having the Attribution clause and a Share Alike clause, contents having the Attribution clause, the Noncommercial clause, and the No Derivative works clause, and contents having the Attribution clause, the Noncommercial clause, and the Share Alike clause. As such, in the case where an existing image or an existing moving picture to which the CCL is applied is edited using a terminal unit, and if the CCL information is not classed a file is not edited, reselection is not necessary.

Figure 8:
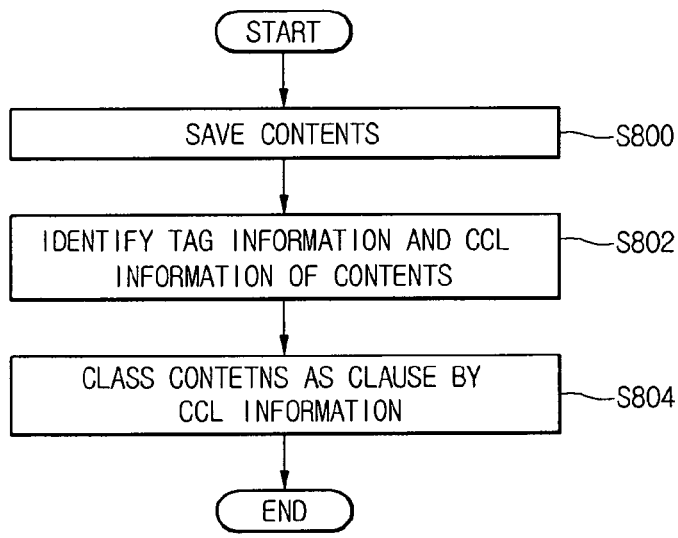
FIG. 8 is a flowchart illustrating a process of classing a file by the CCL information of the file according to an embodiment.

FIG. 8 is a flowchart illustrating a process of classing a file by CCL information of the file according to an embodiment. In operation S800, contents are saved in a terminal unit. In operation S802, tag information and CCL information are checked in a header file of the saved contents. In operation S804, the contents are classed as a corresponding clause by the checked CCL information.

Figure 9:
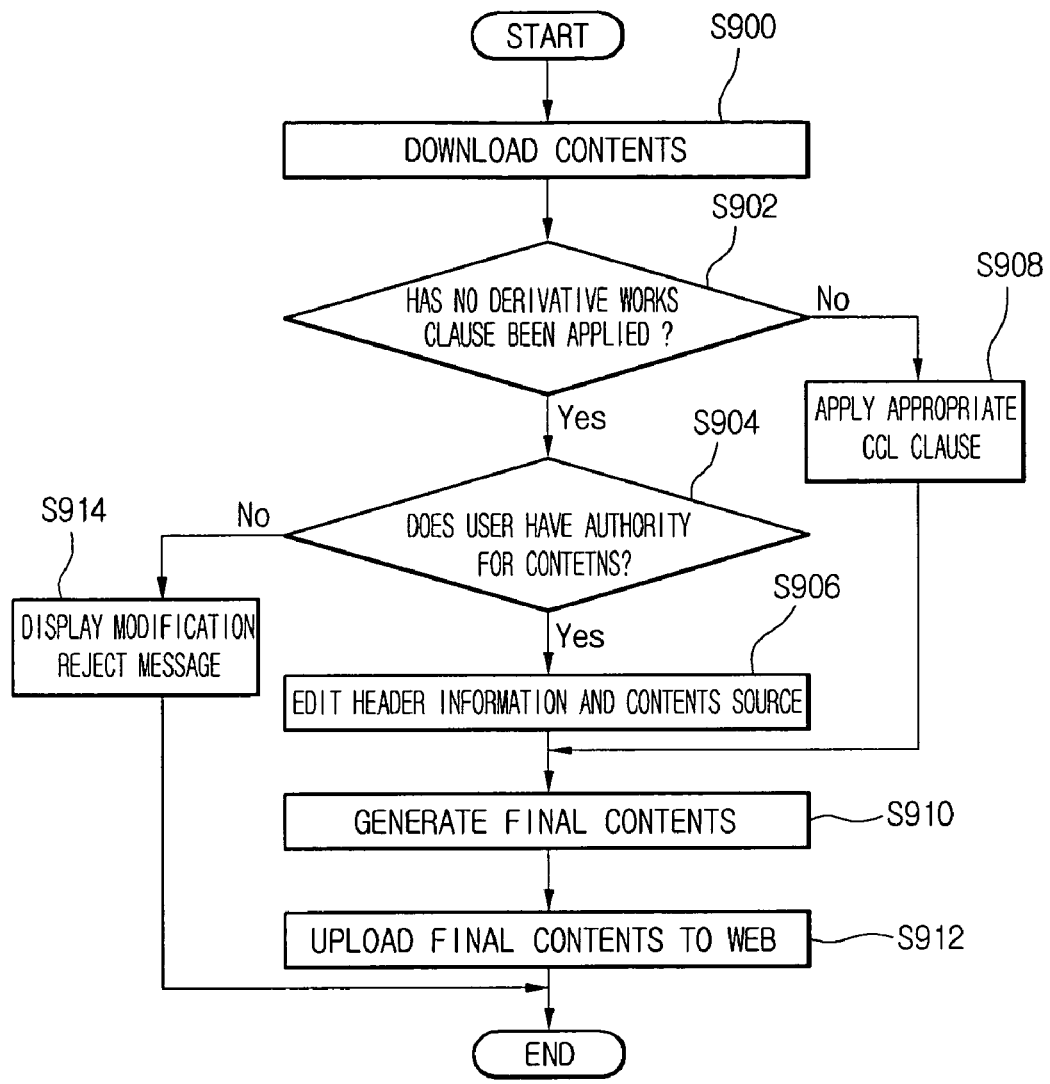
FIG. 9 is a flowchart illustrating a process of editing contents to which a CCL is applied according to an embodiment.

FIG. 9 is a flowchart illustrating a process of editing contents to which a CCL is applied according to an embodiment. In operation S900, the contents are downloaded from a server on the web or a storage device. In operation S902, it is determined whether a "No Derivative Works" clause is in header information of the contents that has been downloaded. If the "No Derivative Works" clause is in the header information, in operation S904, it is determined through certification whether a user has authority for the contents. If the user has the authority for the contents, in operation S906, the header information and a contents source can be edited. In operation S908, if the "No Derivative Works" clause is not in the contents that have been downloaded, a new CCL clause is applied. After the application of the new CCL clause or the editing of the header information and the contents source are finished, in operation S910, the contents are generated and saved. After the newly edited contents are generated, in operation S912, the newly edited contents are uploaded to a server on the web. If the authority for the contents is not certified in operation 904, in operation S914, a modification reject message is displayed.

All can be edited except for a CCL including the "No Derivative Works" clause. An existing header file is not changed when saved. As a result, although an original source is changed, all related to the copyright holder is not changed. When a file of contents is uploaded to a server on the web, the address of a corresponding webpage is added to the header file with the information of the header file being maintained. A user can look at the information of the header file in the webpage to which the contents have been uploaded. When the contents that the copyright holder has uploaded are downloaded, the information of a CCL header is included in the contents. In the case of the application of DRM due to the "No Derivative Works" clause, the corresponding device can be configured to perform the decoding of the DRM.

According to the embodiments, an appropriate CCL is selected and inserted into header information when copyright materials are generated in a terminal unit. A CCL icon or a CCL abbreviation is displayed when a file is reproduced. The CCL information in the header information of the copyright materials saved in the terminal unit is checked to be available as part of a library according to the applied CCL and the header information is checked to modify the CCL, and thus a user easily applies the CCL to the copyright materials and modify the CCL.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for generating digital contents in a terminal, the method comprising:
    receiving, via the terminal, a file creation command to create a file for the digital contents;
    determining, by the terminal, whether a command to apply copyright to the file is received when the file creation command to create the file is received;
    displaying, via the terminal, a copyright list if the command to apply copyright is received, the copyright list including copyright clauses;
    receiving, via the terminal, a copyright selection command selecting a copyright clause to be applied to the file from the copyright list;
    inserting the selected copyright clause into a file information selection of the file; and
    generating the file including the selected copyright clause, wherein the generated file is classified by the selected copyright clause, and managed with:
    contents having an Attribution clause, which has a copyright holder; and contents having at least one of a Noncommercial clause, a No Derivative Works clause and a Share Alike clause; and
    editing an existing image or an existing moving picture to which a creative commons license (CCL) comprising a copyright clause is applied using the classified information;
    wherein a header of the file comprises information for determining whether the copyright is applied, a copyright holder name, a copyright type, at least one of a copyright icon and an initial of the copyright clause to be applied, a site address to which the digital contents are uploaded, a CCL offset to display a position at which the CCL icon or the initial of the copyright clause, a copyright holder display file offset field assigned to indicate a position at which a copyright holder display file is displayed, and an encoded key value for digital right management.

2. The method according to claim 1, wherein the generated file is classified by the selected copyright clause, and managed with:
    contents having the Attribution clause; and
    contents having the Noncommercial clause and the Share Alike clause.

3. The method according to claim 1, wherein the copyright clause is inserted into a header of the file.

4. A method for managing digital contents in a terminal, the method comprising:
    recording, in a storage unit of the terminal, a digital content, wherein the digital content is checked referring to at least one of a tag information and a creative commons license (CCL) information in a header file and classified as a corresponding clause by the checked CCL information;
    determining, by the terminal, whether a command to apply copyright to a file for the digital content is received;
    determining whether copyright for a No Derivative Works clause is applied to the file if the command to apply copyright is received;
    determining whether the file is encoded if the No Derivative Works clause is applied;
    applying a digital right management for setting a key value to certify an authority if the file is encoded; and
    generating and storing final contents in the file;
    checking whether a user has authority for the contents when the user performs to modify the stored contents or a downloaded contents having the No Derivative Works clause; and
    editing the contents based on the checked result;
    wherein the header of the file comprises information for determining whether the copyright is applied, a copyright holder name, a copyright type, at least one of a copyright icon and an initial of the copyright clause to be applied, a site address to which the digital contents are uploaded, a CCL offset to display a position at which the CCL icon or the initial of the copyright clause, a copyright holder display file offset field assigned to indicate a position at which a copyright holder display file is displayed, and an encoded key value for digital right management.

5. A method of managing digital contents in a terminal, the method comprising:
    storing, in a storage unit of the terminal, the digital contents;
    checking, by the terminal, tag information and copyright information of the stored digital contents; and
    classifying the digital contents according to clauses of the copyright information to display the classified contents via a display unit of the terminal wherein the digital contents are classified into contents having an Attribution clause, which has a copyright holder, contents having at least one of a Noncommercial clause and a No Derivative Works clause, or contents having the Noncommercial clause and a Share Alike clause;

wherein a header digital contents file comprises information for determining whether the copyright is applied, a copyright holder name, a copyright type, at least one of a copyright icon and an initial of the copyright clause to be applied, a site address to which the digital contents are uploaded, a creative commons license (CCL) offset to display a position at which the CCL icon or the initial of the copyright clause, a copyright holder display file offset field assigned to indicate a position at which a copyright holder display file is displayed, and an encoded key value for digital right management.

6. A method of managing digital contents in a terminal, the method comprising:
- storing, in a storage unit of the terminal, the digital contents; checking, by the terminal, copyright information of the stored digital contents;
- determining whether a No Derivative Works clause is included in the copyright information;
- determining whether a user has authority for the contents if the No Derivative Works clause is included in the digital contents;
- modifying header information of the digital contents and a source of the digital contents if the user has the authority; and
- generating and storing the modified digital contents wherein the generated file is classified by the selected copyright clause, and managed with:
- contents having an Attribution clause, which has a copyright holder; and
- contents having at least one of a Noncommercial clause, a No Derivative Works clause and a Share Alike clause;
- wherein the header of the file comprises information for determining whether the copyright is applied, a copyright holder name, a copyright type, at least one of a copyright icon and an initial of the copyright clause to be applied, a site address to which the digital contents are uploaded, a creative commons license (CCL) offset to display a position at which the CCL icon or the initial of the copyright clause, a copyright holder display file offset field assigned to indicate a position at which a copyright holder display file is displayed, and an encoded key value for digital right management.

7. The method according to claim 6, further comprising:
displaying, via a display unit of the terminal, a modification reject message if the user has no authority for the contents.

8. A device for managing digital contents, the device comprising:
- a display unit configured to display various commands;
- a user input unit configured to receive a copyright application command to create a file;
- a creative commons license (CCL) generation unit configured to insert copyright information into head information of the file if the copyright application command is received;
- a storage unit in which an icon for the copyright information and the digital contents are saved; and
- a control unit configured to apply copyright to the file if a selection command to apply the copyright to the file is received while the file is created wherein the copyright information comprises an Attribution clause, which has a copyright holder, and at least one of a Noncommercial clause, a No Derivative Works clause and a Share Alike clause;
- wherein the header of the file comprises information for determining whether the copyright is applied, a copyright holder name, a copyright type, at least one of a copyright icon and an initial of the copyright clause to be applied, a site address to which the digital contents are uploaded, a CCL offset to display a position at which the CCL icon or the initial of the copyright clause, a copyright holder display file offset field assigned to indicate a position at which a copyright holder display file is displayed, and an encoded key value for digital right management.

9. The device according to claim 8, further comprising: a creative commons license extraction unit configured to extract the copyright information from the digital contents.

10. The device according to claim 8, wherein the control unit classifies the file according to a copyright application clause of the digital contents extracted from a creative commons license extraction unit.

11. The device according to claim 8, wherein the control unit checks the inserted copyright information of the saved digital contents through a creative commons license extraction unit so as to apply the applied copyright again.

12. A method of generating digital contents in a terminal, the method comprising:
- generating and displaying, via a display unit of the terminal, a user interface window including a clause for managing digital contents copyright information; and
- generating the digital contents including copyright information, applied while generating the digital contents, selected from the displayed user interface window;
- wherein the user interface window includes a clause to be applied to the digital contents, and the clause is at least one of an Attribution clause, a Noncommercial clause, a No Derivative Works clause and a Share Alike clause, and
- wherein the generated digital contents is classified by:
- contents having the Attribution clause, which has a copyright holder; and
- contents having the Noncommercial clause, the No Derivative Works clause or the Share Alike clause;
- wherein a header of the digital contents file comprises information for determining whether the copyright is applied, a copyright holder name, a copyright type, at least one of a copyright icon and an initial of the copyright clause to be applied, a site address to which the digital contents are uploaded, a creative commons license (CCL) offset to display a position at which the CCL icon or the initial of the copyright clause, a copyright holder display file offset field assigned to indicate a position at which a copyright holder display file is displayed, and an encoded key value for digital right management.

13. The method according to claim 12, wherein the user interface window comprises at least one of a first item used for determining whether copyright is applied, and a second item used for determining what type of copyright is applied.

14. The method according to claim 13, wherein the second item is displayed in the form of one of a list and an icon.

15. The method according to claim 12, wherein the user interface window is generated and displayed when a digital contents generation command is received.

16. The method according to claim 12, wherein the user interface window is generated and displayed when copyright is applied to the digital contents that have already been generated.

17. The method according to claim 12, further comprising: determining whether or not to display the copyright information of the digital contents when the digital contents are reproduced.

18. The method according to claim 12, wherein the copyright information is generated as one element of the digital contents.

19. The method according to claim 12, wherein a use of the digital contents is restricted by the copyright information.

20. The method according to claim 12, wherein the copyright information included in the digital contents restricts a generation of new contents using the digital contents.

21. The method according to claim 12, wherein the copyright information included in the digital contents restricts kinds of copyrights applicable to the digital contents.

* * * * *